US010275142B2

(12) United States Patent
Bostick et al.

(10) Patent No.: US 10,275,142 B2
(45) Date of Patent: Apr. 30, 2019

(54) MANAGING CONTENT DISPLAYED ON A TOUCH SCREEN ENABLED DEVICE

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Craig M Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 710 days.

(21) Appl. No.: 14/526,573

(22) Filed: Oct. 29, 2014

(65) Prior Publication Data

US 2016/0124618 A1 May 5, 2016

(51) Int. Cl.
*G06F 3/0481* (2013.01)
*G06F 3/0488* (2013.01)
(Continued)

(52) U.S. Cl.
CPC .......... *G06F 3/0488* (2013.01); *G06F 3/0481* (2013.01); *G06F 9/44* (2013.01);
(Continued)

(58) Field of Classification Search
CPC ........ G06F 17/21; G06F 17/211; G06F 17/24; G06F 3/0484; G06F 3/04845; G06F 3/0488; G06F 3/0481; G06F 9/44
See application file for complete search history.

(56) References Cited

U.S. PATENT DOCUMENTS 7,028,258 B1 4/2006 Thacker et al.
7,131,060 B1 * 10/2006 Azuma .................. G06T 11/60
715/260

(Continued)

OTHER PUBLICATIONS

Tutorial: Manipulating Images With Touch Gestures, http://maniacdev.com/2011/07/tutorial-manipulating-images-with-touch-gestures, Maniacdev.com, as of Jun. 2, 2014, 5 pages.

(Continued)

*Primary Examiner* — Ting Z Lee
(74) *Attorney, Agent, or Firm* — Brian Restauro; Andrew M. Calderon; Robers Mlotkowski Safran Cole & Calderon, P.C.

(57) ABSTRACT

Approaches are provided for managing content displayed on a touch screen enabled device. An approach includes collecting data regarding contents of an electronic document that is opened on a device. The approach further includes separating the contents into individual layers and determining a position of each of the contents within the electronic document. The approach further includes detecting a manipulation of a first piece of content of the contents on the device, and determining the manipulation of the first piece of content has created an obstruction of readability or viewability of at least a portion of a second piece of content of the contents. The approach further includes adjusting the second piece of content such that the readability or viewability of the portion of the second piece of content is not obstructed by the first piece of content.

19 Claims, 12 Drawing Sheets

(51) Int. Cl.
   *G06F 3/0484* (2013.01)
   *G06F 9/44* (2018.01)
   *G06F 17/21* (2006.01)
   *G06F 17/24* (2006.01)

(52) U.S. Cl.
   CPC ........ *G06F 3/0484* (2013.01); *G06F 3/04845* (2013.01); *G06F 17/21* (2013.01); *G06F 17/211* (2013.01); *G06F 17/24* (2013.01)

(56) References Cited

U.S. PATENT DOCUMENTS

| | | | |
|---|---|---|---|
| 7,168,038 B2 | 1/2007 | Lui et al. | |
| 7,743,325 B2 | 6/2010 | Berker et al. | |
| 8,624,860 B2 | 1/2014 | Lee et al. | |
| 2004/0003350 A1* | 1/2004 | Simmons | G06F 17/211 715/244 |
| 2006/0026504 A1* | 2/2006 | Balinsky | G06F 17/211 715/246 |
| 2006/0179405 A1* | 8/2006 | Chao | G06F 17/248 715/209 |
| 2008/0215964 A1* | 9/2008 | Abrams | G06F 17/21 715/246 |
| 2010/0251189 A1* | 9/2010 | Jaeger | G06F 3/0481 715/863 |
| 2011/0252346 A1* | 10/2011 | Chaudhri | G06F 3/04817 715/765 |
| 2013/0191711 A1* | 7/2013 | Tashman | G06F 17/241 715/205 |
| 2013/0339830 A1 | 12/2013 | Yuan et al. | |
| 2014/0082530 A1* | 3/2014 | De Oliveira | G06F 17/211 715/762 |
| 2014/0165006 A1* | 6/2014 | Chaudhri | G06F 3/04817 715/835 |
| 2014/0351721 A1* | 11/2014 | DeLuca | G06F 9/4443 715/760 |
| 2015/0242092 A1* | 8/2015 | Van Os | G06F 3/04817 715/765 |

OTHER PUBLICATIONS

"Gestures, manipulations, and interactions (HTML)", http://msdn.microsoft.com/en-us/library/windows/apps/hh761498.aspx, Microsoft.com, as of Jun. 2, 2014, 4 pages.

\* cited by examiner

MANAGING CONTENT DISPLAYED ON A TOUCH SCREEN ENABLED DEVICE

FIELD OF THE INVENTION

The present invention generally relates to content management, and more particularly, to systems and methods for managing content displayed on a touch screen enabled device.

BACKGROUND

The pervasiveness of touch screen enabled devices is ever increasing, including both mobile device and stationary device types. For example, users can interact with a traditional desktop computer, a tablet computer, a mobile phone, and so on to access a variety of functionality for work and personal uses. Additionally, the variety of functionality that is available to users of touch screen enabled devices also continues to increase.

However, interaction by a user with touch screen enabled devices, and related display content such as documents, web pages, images, video, notifications, etc., can be hindered by the plethora of display content submitted continuously to the display of the touch screen enabled devices. This volume of display content can provide viewability and readability obstructions along with a distraction to the user, who typically view or read the displayed content to determine its relevance to the user at any given moment. Consequently, navigation through these multiply pieces of displayed content to easily view, read, and locate desired information can take a significant amount of time, which can be further complicated by any number of applications that are running on the touch screen device.

SUMMARY

In a first aspect of the invention, a method is provided for that includes collecting data regarding contents of an electronic document that is opened on a device. The data includes types of the contents and positional data of the contents. The method further includes separating the contents into individual layers based on the types of the contents. The method further includes determining a position of each of the contents within the electronic document based on the positional data of the contents. The method further includes detecting a manipulation of a first piece of content of the contents on the device. The method further includes determining whether the manipulation of the first piece of content has created an obstruction of readability or viewability of at least a portion of a second piece of content of the contents based on an updated position of the first piece of content and the determined position of the second piece of content. The method further includes when the manipulation of the first piece of content has created the obstruction of the readability or viewability of the portion of the second piece of content, adjust the second piece of content such that the readability or viewability of the portion of the second piece of content is not obstructed by the first piece of content.

In another aspect of the invention, a computer program product is provided for managing a display of content within an opened electronic document on a touch screen enabled device. The computer program product includes a computer readable storage medium having program instructions embodied therewith. The computer readable storage medium is not a transitory signal per se, and the program instructions are readable by a computing device to cause the computing device to perform a method that includes collecting data regarding contents of the electronic document, wherein the data includes types of the contents and positional data of the contents. The method further includes separating the contents into individual layers based on the types of the contents. The method further includes determining a position of each of the contents within the electronic document based on the positional data of the contents. The method further includes receiving a notification via an application programming interface that a gesture has occurred on the touch screen enabled device that is indicative of a manipulation of a first piece of content of the contents. The method further includes determining the manipulation of the first piece of content has created an obstruction of readability or viewability of at least a portion of a second piece of content of the contents based on an updated position of the first piece of content and the determined position of the second piece of content. The method further includes adjusting the second piece of content such that the readability or viewability of the portion of the second piece of content is not obstructed by the first piece of content.

In a further aspect of the invention, a system is provided for that includes a CPU, a computer readable memory and a computer readable storage medium. The system further includes program instructions to collect data regarding contents of one or more windows that are opened on a touch screen enabled device, wherein the data includes types of the contents, positional data of the contents, and positional data of the one or more windows. The system further includes program instructions to determine a position of each of the contents and one or more windows based on the positional data of the contents and the one or more windows. The system further includes program instructions to detect a manipulation of a first window of the one or more windows by way of a gesture on the touch screen enabled device. The system further includes program instructions to determine the manipulation of the first window has created an obstruction of readability or viewability of at least a portion of a piece of content of the contents displayed in a second window based on an updated position of the first window and the determined position of the piece of content displayed in the second window. The system further includes program instructions to adjust the piece of content displayed in the second window such that the readability or viewability of the portion of the piece of content is not obstructed by the first window. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
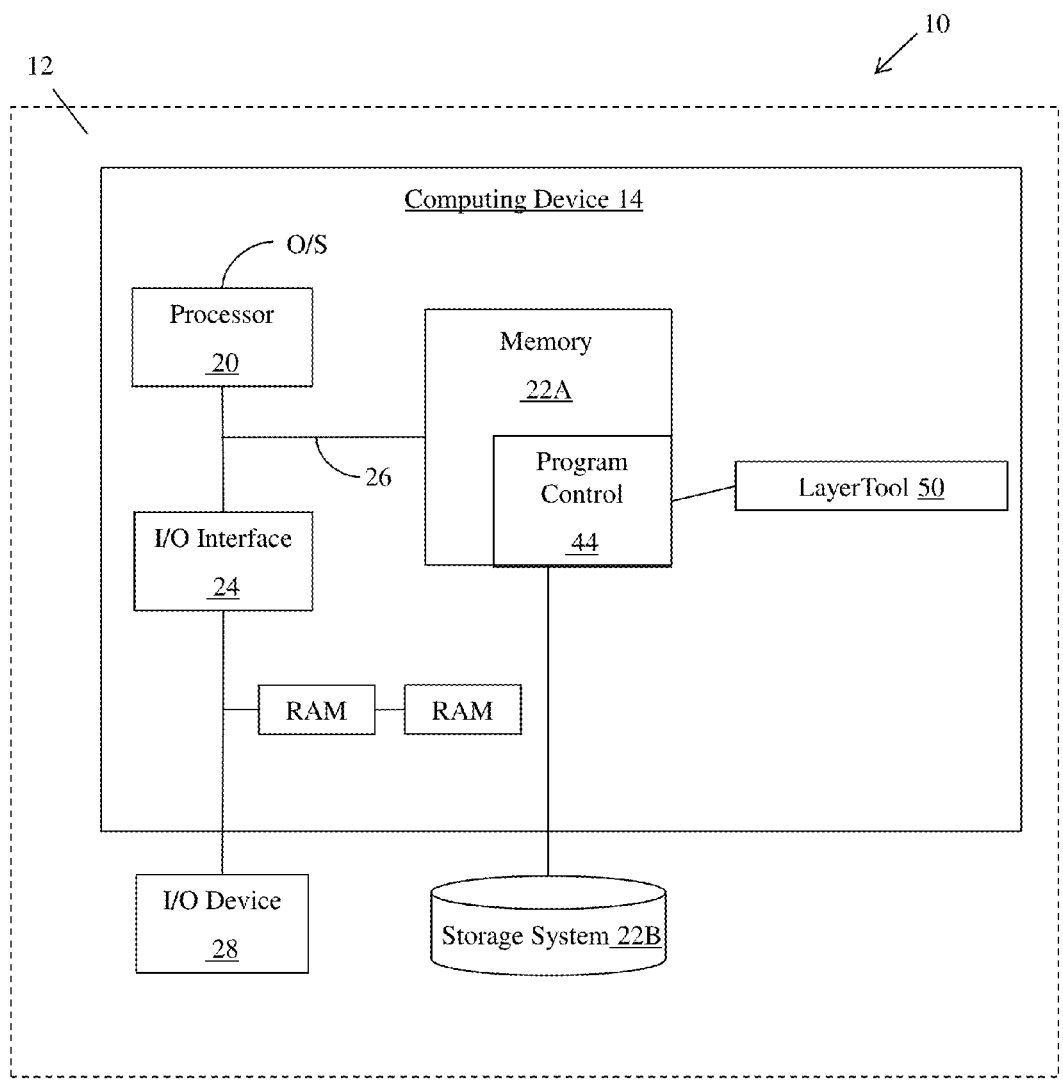
FIG. 1 shows an illustrative environment for implementing the steps in accordance with aspects of the invention.

The present invention generally relates to content management, and more particularly, to systems and methods for repositioning content displayed on a touch screen enabled device. More specifically, implementations of the invention provide systems and methods that create a floating layer comprising content e.g., media type content such as an image or video, in touch screen enabled devices such that a user can change a position or size of the content within the floating layer, and another layer of content (e.g., text) can be automatically rearranged based on the change in position or size of the content within the floating layer such that readability or viewability of the content within the other layer is not significantly affected as presented to the user. In other embodiments, the viewable display area of a touch screen can be calculated dynamically through a mapping of foreground applications such that a user can change a position or size of a window for an associated application, and content (e.g., text) of another window can be automatically rearranged based on the change in position or size of the window for the associated application such that readability or viewability of the content within the other window is not significantly affected as presented to the user. The present invention provides many advantages over conventional touch screen enabled devices, which do not rearrange content based on readability or viewability obstructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., graphic user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a layer tool 50, which performs processes described herein. The layer tool 50 can be implemented as one or more program code in program control 44 stored in memory 22A as separate or combined modules. Additionally, the layer tool 50 may be implemented as separate dedicated processors or a single or several processors to provide the function of the layer tool 50. While executing the computer program code, the processor 20 can read and/or write data to/from memory 22A, storage system 22B, and/or I/O interface 24. The program code executes the processes of the invention. The bus 26 provides a communications link between each of the components in computing device 14.

In embodiments, the layer tool 50 may be implemented within the O/S of the computing device 14 (e.g., a touch screen enabled device) or as a standalone application or module within the computing device 14, and made available (e.g., made available as a service) to applications of the computing device 14 by way of an application programming interface (API) framework. The API framework defines a set of functionalities of the layer tool 50 that are independent of their respective implementation, allowing both definition and implementation to vary without compromising each other. The API framework is used to allow for the integration of new functionality into the applications of the computing device 14, or to share data between the applications and the layer tool 50.

By way of example, the layer tool 50 may be configured to provide the functionality of determining the content of one or more electronic documents, and separating that content into individual floating layers. In embodiments, the layer tool 50 may be further configured to collect data from the applications that include positional data of content displayed within one or more electronic documents or one or more windows, and positional data of the one or more windows. In additional embodiments, the layer tool 50 may be further configured to provide the functionality of (i) tracking and mapping the positional data for the contents and the one or more windows, (ii) determining whether there is a conflict between each of the contents (e.g., a piece of content is covering at least a portion of another piece of content) or between the contents and the one or more windows (e.g., a window is covering at least a portion of a piece of content) based on the tracked and mapped positional data, and (iii) when there is a conflict, adjusting one or more of the contents within the one or more electronic documents or the one or more windows such that there is no conflict between the contents or the contents and the one or more windows. In yet additional embodiments, the layer tool 50 may be further configured to provide the functionality of (i) determining whether the readability or viewability of the one or more of the contents is impaired as a result of the adjusting the one or more of the contents, and (ii) upon determining the readability or viewability of the one or more of the contents is impaired, further adjusting the one or more of the contents within the one or more electronic documents or the one or more windows such that the readability or viewability of the one or more of the contents is not impaired.

The computing device 14 can comprise any general purpose computing article of manufacture capable of executing computer program code installed thereon (e.g., a personal computer, a mobile device, a server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
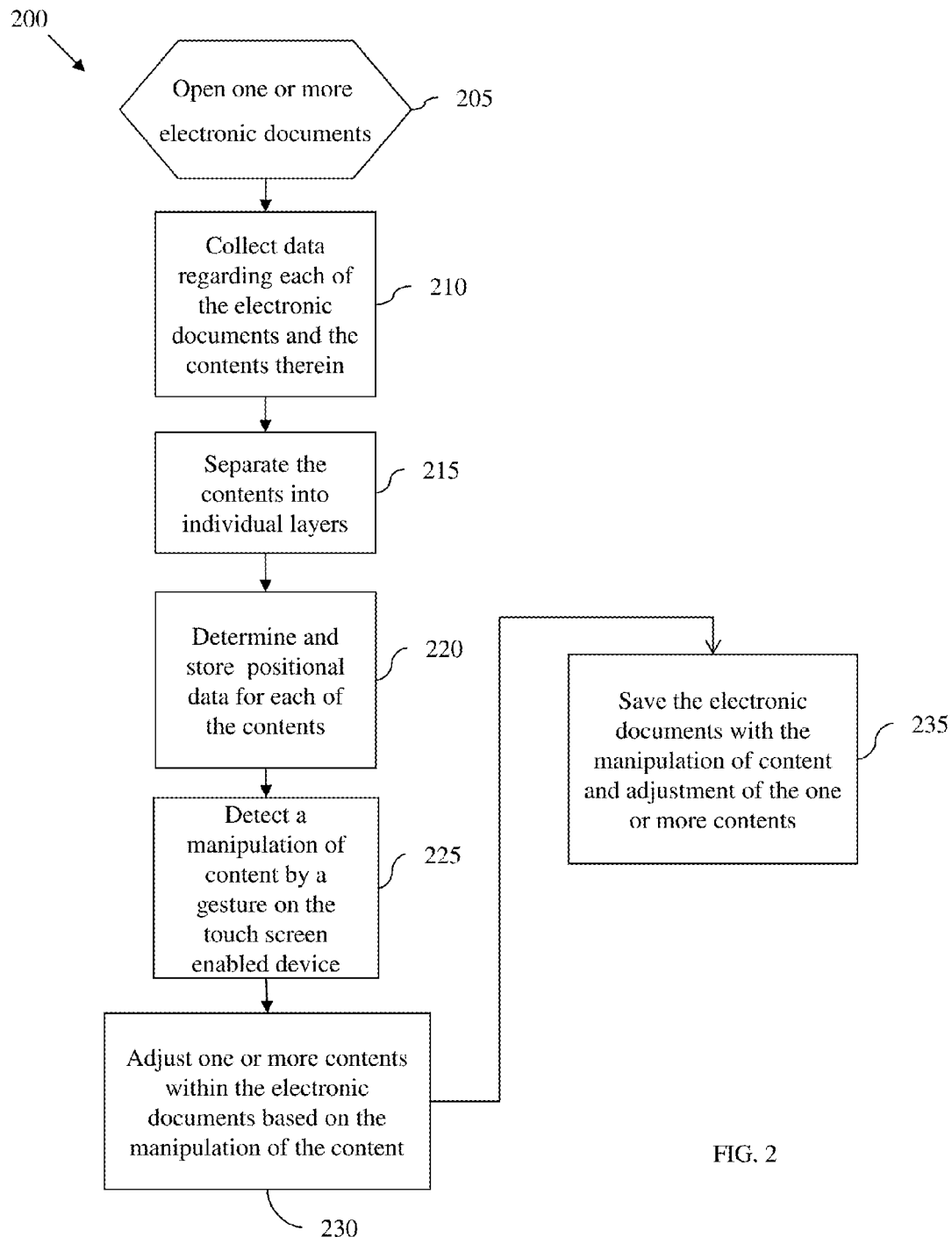
FIG. 2 shows an exemplary flow in accordance with aspects of the invention.
Figure 6:
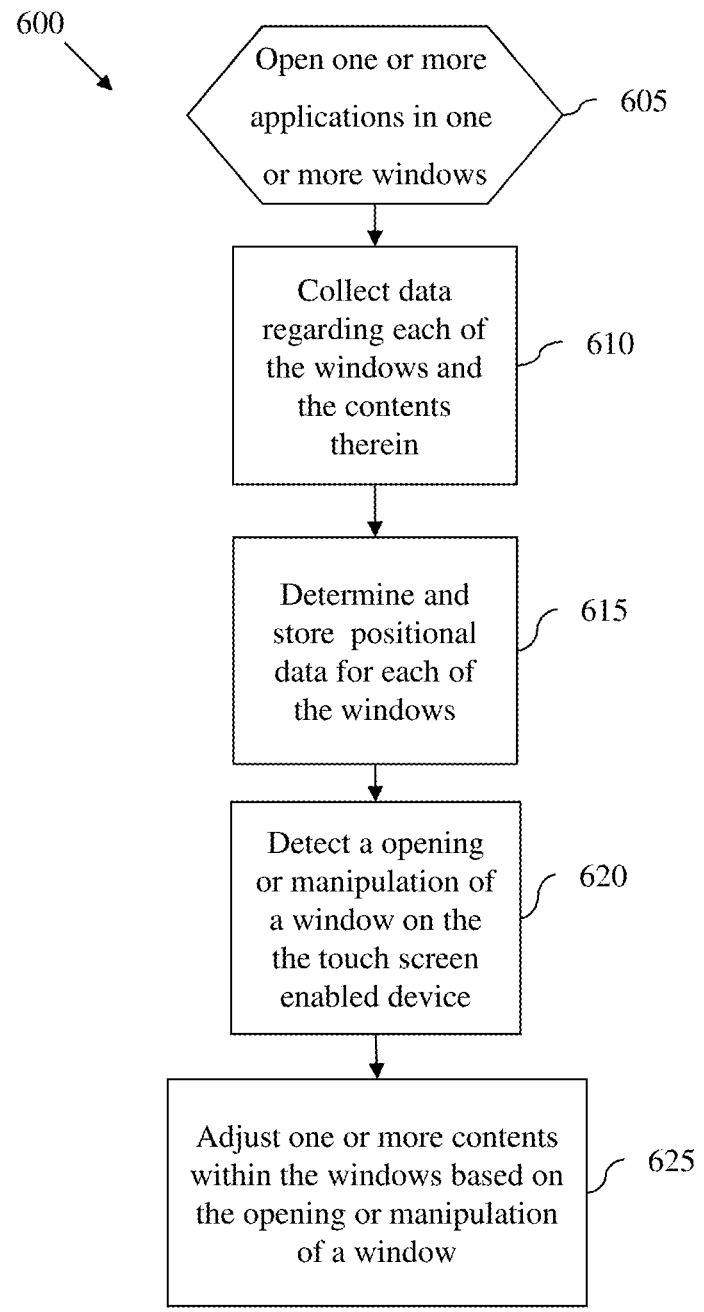
FIG. 6 shows an exemplary flow in accordance with aspects of the invention.

FIGS. 2 and 6 show exemplary flows for performing aspects of the present invention. The steps of FIGS. 2 and 6 may be implemented in the environment of FIG. 1, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 2 is a flow diagram illustrating a process 200 for managing the display of content within opened electronic documents on a touch screen enabled device in accordance with aspects of the present invention. At step 205, one or more electronic documents (e.g., a Microsoft® Word document or an Adobe® portable document, which are registered trademarks of Microsoft Corporation and Adobe System Inc., respectively, in the United States and/or other countries) are opened using an appropriate document generating and/or editing application (e.g., Microsoft® Office or Adobe® Reader®, which are registered trademarks of Microsoft Corporation and Adobe System Inc., respectively, in the United States and/or other countries) on a touch screen enabled device (e.g., computing device 14 as described with respect to FIG. 1). In embodiments, the one or more electronic documents may be any type of document, such as a report, a letter, a news article, a book, a travel document, a time card, a purchasing or sales agreement, a drawing, an image, a spreadsheet, or other electronic form such as artwork or a blueprint, etc. It should be understood by those of ordinary skill in the art that the present invention is not limited by the type of electronic document that is opened.

At step 210, data regarding each of the opened one or more electronic documents and the contents therein are collected. For example, a layer tool (e.g., layering tool 50 as described with respect to FIG. 1) may be configured to collect data from the metadata of each of the opened one or more electronic documents and the contents therein. In embodiments, the data collected may include positional data for each of the one or more electronic documents opened within a display of the touch screen enabled device, the type of content displayed within each of the one or more electronic documents such as text, images, video, audio, animations, etc., positional data for any text, images, audio, animations, etc., displayed within the one or more electronic documents, a size and type of font used for any text displayed within the one or more electronic documents, and/or a data size of each of the opened one or more electronic documents and the contents therein. The positional data may be "x" and "y" coordinates of a predetermined number of data points along a border or outline of each of the one or more electronic documents and the contents. The starting point for the positional data may be any reference point from which to calculate positional data such as a corner of a display of the touch screen enabled device and/or a corner of one or more of the electronic documents in which the content is displayed. Once the data for each of the opened one or more electronic documents and their corresponding contents is collected, the data may be stored in a data structure such as a hash table for later retrieval and subsequent analysis.

Figure 3:
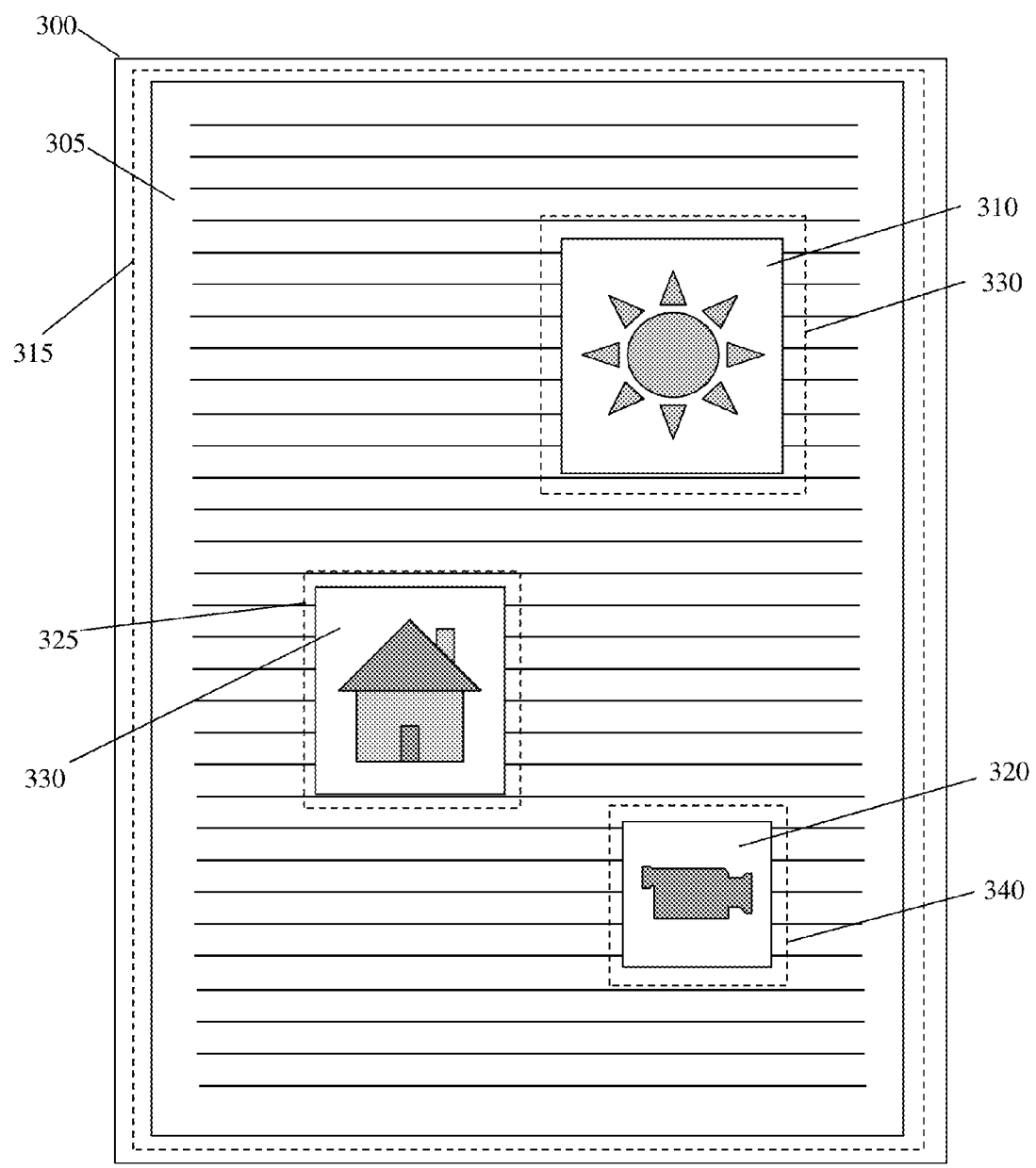
FIGS. 3, 4, 5A, 5B, and 5C show visual representations of examples of operation in accordance with aspects of the invention.

At step 215, the contents of the opened one or more electronic documents are separated into individual layers based on the collected data (e.g., the positional data and type of content data). For example, as shown in FIG. 3, in the instance that an electronic document 300 is opened comprising text content 305, image content 310, image content 315, and video content 320, the contents are separated using the layer tool (e.g., layer tool 50 as described with respect to FIG. 1) such that a first layer 325 comprises the text content 305, a second layer 330 comprises the image content 310, a third layer 335 comprises image content 315, and a fourth layer 340 comprises the video content 320. In embodiments, the individual layers are created as floating sheets or objects that are stacked on top of each other such that a user may view the contents of the one or more electronic documents by use of the layers. To this end, the first layer 325, the second layer 330, the third layer 335, and the fourth layer 340 are isolated from the originally opened electronic document 300 such that a user is only viewing the first layer 325, the second layer 330, the third layer 335, and the fourth layer 340 superimposed on one another and not the originally opened electronic document 300.

With respect back to FIG. 2, at step 220, the position of each of the contents within the opened one or more electronic documents are determined using a mapping of the data collected for each of the contents and the opened one or more electronic documents. For example, the layer tool (e.g., layer tool 50 as described with respect to FIG. 1) may be configured to map the positional data collected for each of the contents to determine the position of each of the contents within the one or more electronic documents. The position of each of the contents may be stored in the data structure for later retrieval and subsequent analysis. Accordingly, the layer tool is made aware of the exact position on the display of the touch screen enabled device for each of the contents and the corresponding opened one or more electronic documents.

At step 225, a manipulation of content by a gesture on the touch screen enabled device is detected. For example, the layer tool (e.g., layer tool 50 as described with respect to FIG. 1) may be configured to detect a manipulation of content based on a user initiated gesture on the touch screen enabled device. A gesture is the physical act or motion performed on, or by, the input device (finger, fingers, pen/stylus, mouse, and so on). For example, to launch, activate, or invoke a command, a user may use a single finger tap for the touch screen enabled device (equivalent to a left-click with a mouse, a tap with a pen, or Enter on a keyboard). The manipulation is the ongoing reaction or response that the object (e.g., the content) or user interface has to the gesture. For example, both a pinch and stretch gesture typically cause content to shrink and expand in some manner. The final outcome of the manipulation, how the manipulation is manifested by the content on the screen and in the user interface, is the interaction. Interactions depend on how a manipulation is interpreted and the command or action that results from the manipulation. For example, content can be moved through both slide and swipe gestures, but the results may differ depending on whether a distance threshold is crossed.

In some embodiments, the detection of the gesture and resulting manipulation and interaction with content may include gathering data about touch events on the touch screen enabled device and interpreting the gathered data to determine whether the gathered data meets any criteria supported by the layer tool as a recognized manipulation of content. The detection of the gesture may start when a user first touches the touch screen with a finger or other mechanism of manipulation (e.g., a stylus), continues as the device tracks the position of the user's finger(s) or other mechanism of manipulation, and ends by capturing a final event of the user's fingers or other mechanism leaving the screen. Throughout this interaction, positional data of the user's finger(s) or other mechanism of manipulation delivered to the device provides the details of every interaction. The layer tool can use the positional data of the user's finger(s) or other mechanism of manipulation delivered to the device to determine if a gesture or other mechanism of manipulation meets any criteria supported by the layer tool as a recognized manipulation of content.

In other embodiments, the detection of the gesture and resulting manipulation and interaction with content may include obtaining recognition of a gesture or other mechanism of manipulation and interpreting the gesture or other mechanism of manipulation to determine whether the gesture or other mechanism of manipulation meets any criteria supported by the layer tool as a recognized manipulation of content. The obtaining the recognition may include receiving a notification via the API framework (e.g., as described with respect to FIG. 1) from the appropriate document generating and/or editing application that a particular gesture or other mechanism of manipulation has occurred. For example, the appropriate document generating and/or editing application that opened the electronic document may include functionality for recognizing common gestures or other mechanisms of manipulation and reporting such recognition to another program (e.g., the layer tool) and/or the touch screen enabled device via the API framework. The layer tool can use the notification of the recognition of a gesture or other mechanism of manipulation by the appropriate document generating and/or editing application to determine if the gesture or other mechanism of manipulation meets any criteria supported by the layer tool as a recognized manipulation of content.

In embodiments, the criteria supported by the layer tool as a recognized manipulation of content may include any resizing of content (e.g., adjusting a relative size of one or more pieces of content within a display area) by way of a pinching or stretching gesture, any rotation of content (e.g., rotating one or more pieces of content relative to a display area) by way of a turning gesture, or any selecting and moving of content (e.g., selecting and dragging content to another position within a display area) by way of a tap or press and hold, and a slide or swipe gesture. However, the above-mentioned criteria are merely illustrative of the present invention and it should be understood by those of ordinary skill in the art that the present invention is not limited by the criteria supported by the layer tool as a recognized manipulation of content.

As should be understood by those of ordinary skill in the art, the layer tool is further configured to update the data stored in the data structure with updated data for each of the manipulated contents, and update the mapping of the data collected for each of the manipulated contents. As such, the layer tool is persistently aware of the position of each of the contents and the electronic documents within the display of the touch screen enabled device no matter whether a new electronic document is opened or existing content is manipulated.

Figure 4:
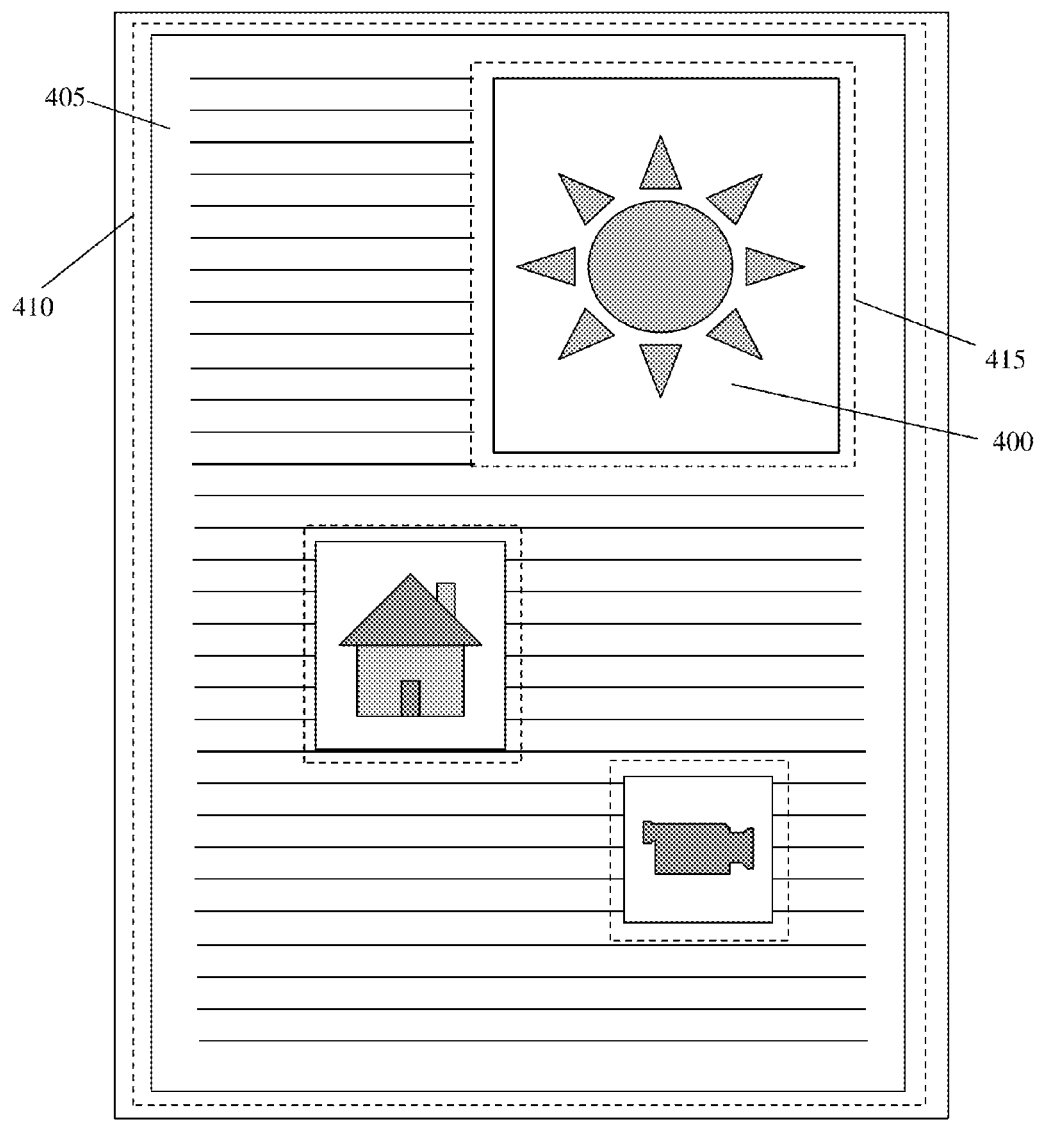

At step 230, an adjustment of one or more of the contents within the one or more electronic documents is performed as a result of the interaction manifested by way of the detected manipulation of the content. For example, as shown in FIG. 4, in the instance that image content 400 is resized (i.e., an interaction manifested by way of a detected manipulation of the image content 400), the layer tool (e.g., layer tool 50 as described with respect to FIG. 1) may be configured to adjust the text content 405 (i.e., one or more of the contents within the one or more electronic documents) within the layer 410 in such a manner that the readability or viewability of the text content 405 is not obstructed or impaired as a result of the resizing of the image content 400.

In embodiments, the adjustment of the one or more of the contents within the one or more electronic documents may include (i) determining whether there is a conflict between each of the contents (e.g., one piece of content is covering or obstructing at least a portion of another piece of content) based on the tracked and mapped positional data, (ii) when there is a conflict, adjusting one or more of the contents within the one or more electronic documents such that there is no conflict between the contents, (iii) determining whether the readability or viewability of the one or more of the contents is impaired as a result of the adjusting the one or more of the contents, and (iv) upon determining the readability or viewability of the one or more of the contents is impaired, further adjusting the one or more of the contents within the one or more electronic documents such that the readability or viewability of the one or more of the contents is not impaired. To this end, the layers of the contents are structured in such a manner that each of the contents are interrelated, and therefore, the manipulation of content within one layer may cause an adjustment of content to be made in another layer in order to maintain the readability or viewability of all contents within the one or more electronic documents.

Figure 5A:
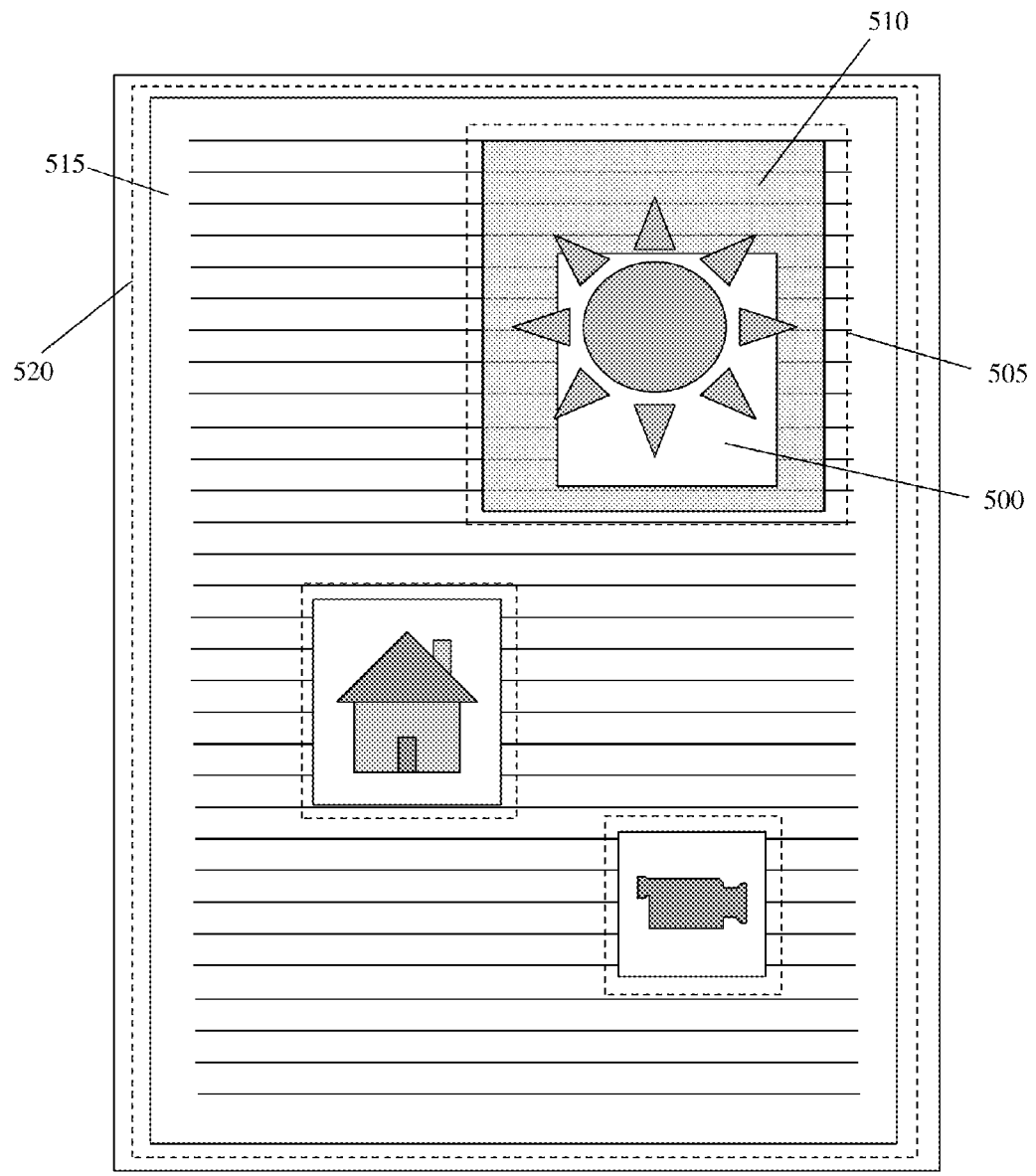

For example, as shown in FIG. 5A, in the instance that image content 500 within the layer 505 is resized, the layer tool (e.g., layer tool 50 as described with respect to FIG. 1)

may be configured to determine that the image content 500 within layer 505 has been resized in such a manner that the image content 500 conflicts with or overlaps at least a portion 510 of the text content 515 within layer 520 based on the tracked and mapped positional data for each of the contents. In embodiments, the determination of the conflict or overlap between the contents may include comparing the starting and updated positional data stored within the data structure for each of the contents. As should be understood by those of ordinary skill in the art, the comparison between the positional data provides data sets to make a determination as to whether the interaction manifested by way of the detected manipulation of the content has caused a conflict or overlap between the contents.

Figure 5B:
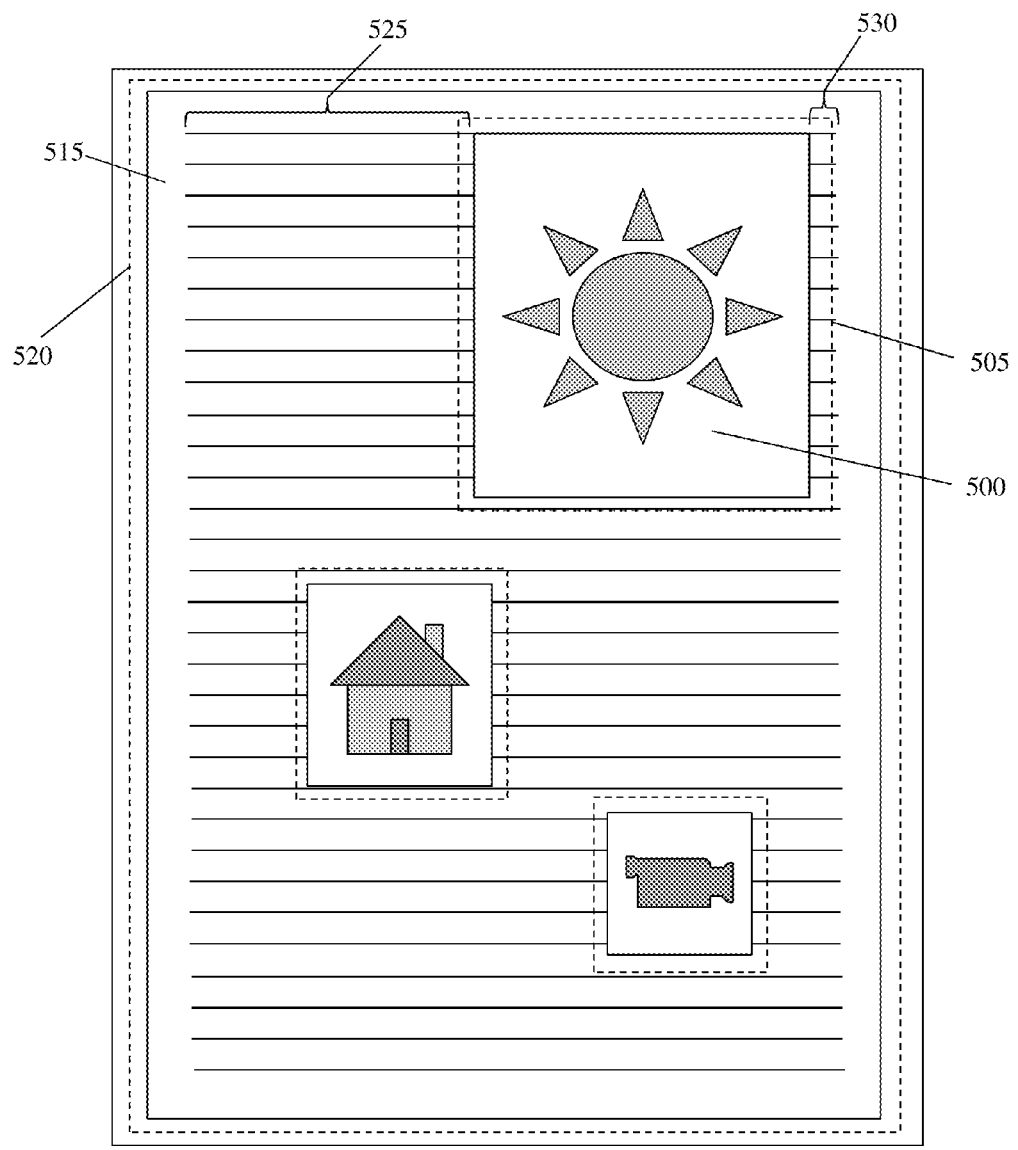

As shown in FIG. 5B, upon a determination that there is a conflict or overlap between the contents, the layer tool (e.g., layer tool 50 as described with respect to FIG. 1) may be further configured to automatically adjust the text content 515 such that there is no conflict or overlap between the text content 515 and the image content 500. In embodiments, the adjustment may include wrapping or realigning the text content 515 around the image content 500. For example, the text content 515 within layer 520 may be adjusted to flow or wrap around the image content 500 within layer 505 such that none of the text content 515 is in conflict with or overlapped by the image content 500. Optionally, the adjustment of the content (e.g., the wrapping or flowing of text around an image) may be controlled by the layer tool based at least in part on preferences set by a user. For example, a user may choose a border (e.g., a width and/or color of a border) to be placed around the image content 500 such that there is a separation or space between the text content 515 and the image content 500. Accordingly, the adjustment of the text content 515 around the image content 500 provides a seamless transition between content of the one or more electronic documents such that the text content 515 is not obscured by the image content 500.

As should be understood by those of ordinary skill in the art, in the instance that the text content 515 within the layer 520 is adjusted, the layer tool may be configured to track and map updated positional data of the text content 515 within the layer 520. As described herein, the updated positional data may be "x" and "y" coordinates of a predetermined number of data points along a border or outline for the text content. Once the updated positional data for the text content is obtained, the updated positional data may be stored in the data structure for later retrieval and subsequent analysis.

As also shown in FIG. 5B, the layer tool (e.g., layer tool 50 as described with respect to FIG. 1) may be further configured to determine whether the readability or viewability of the text content 515 is impaired as a result of the adjustment of the text content 515. For example, the layer tool may be configured to determine one or more aspects 525 and 530 (e.g., height, width, length, blurriness, percentage obstructed, percentage not obstructed, etc.) of the text content 515 based on the collected data including the updated positional data for the text content 515. Thereafter, the layer tool may be further configured to compare the one or more aspects 525 and 530 of the text content 515 to a predetermined threshold that is tolerable or intolerable for the one or more aspects 525 and 530 of the text content 515. Upon the one or more aspects 525 and 530 surpassing or failing the predetermined threshold (e.g., aspect 530 is smaller than a predetermined threshold of a one inch width for the text content 515), the text content 515 may be evaluated by the layer tool as being satisfactory or impaired (e.g., since aspect 530 is smaller than the predetermined threshold of a one inch width for the text content 515, the text content 515 would be evaluated as impaired).

Figure 5C:
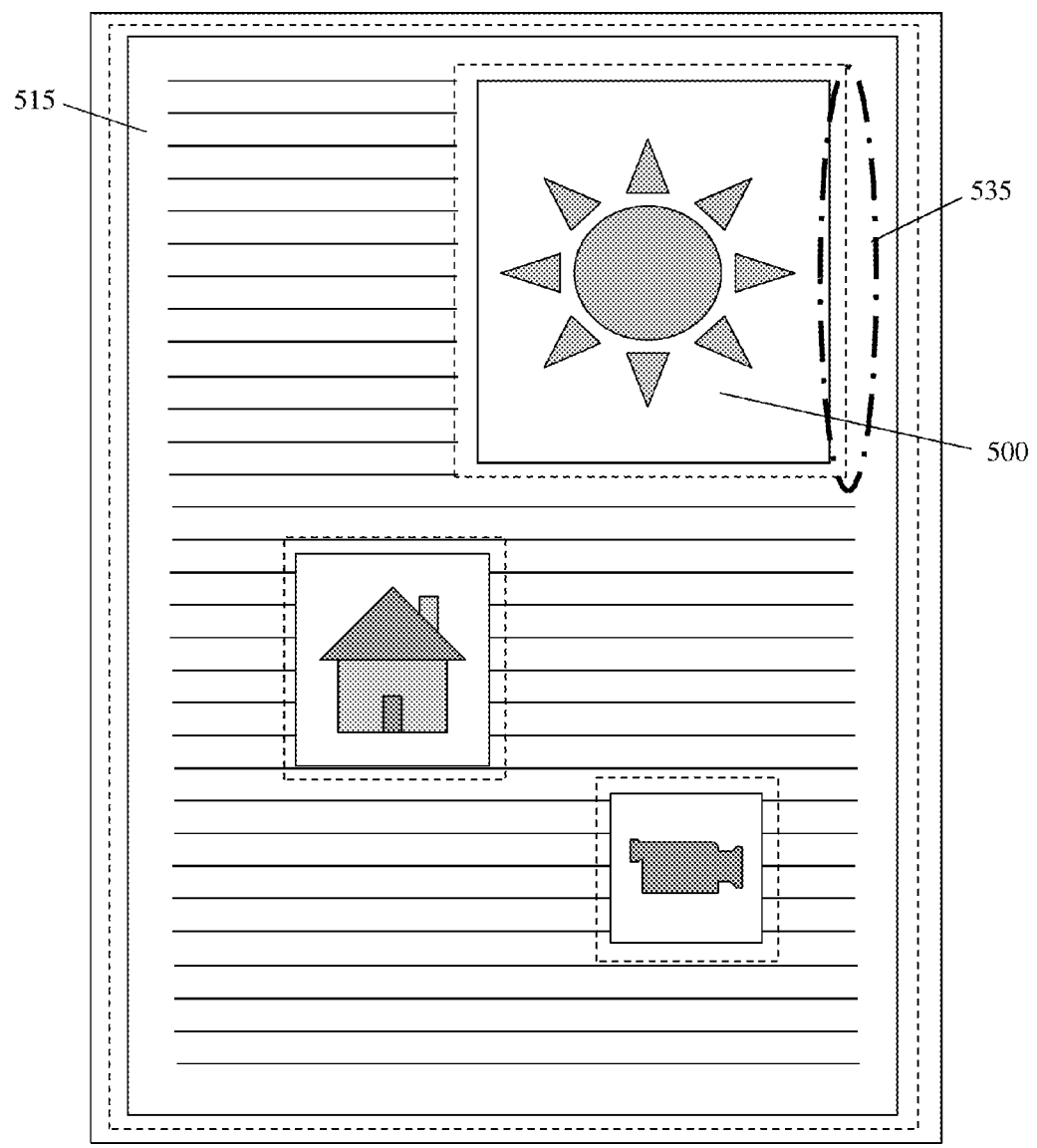

As shown in FIG. 5C, upon a determination that the text content 515 is impaired, the layer tool (e.g., layer tool 50 as described with respect to FIG. 1) may be configured to further adjust the text content 515 such that the readability or viewability of the text content 515 is not impaired. For example, the layer tool may be configured to adjust the text content 515 such that the small aspect portion 535 of the text content 515 is not created from the wrapping of the text content 515 around the image content 500. Instead, the text content 515 is limited to wrapping around the image content 500 from the left and below the image content. In additional or alternative embodiments, the type and size of the font of the text content 515 may be adjusted such that the small aspect portion 535 is not generated during the adjustment of the text content 515 in view of the manipulation of the image content 500.

As should be understood by those of ordinary skill in the art, the above-mentioned examples including modifications of content, aspects of content, and adjustments of content are merely illustrative of the present invention, and thus the present invention is not limited by particular modifications of content, aspects of content, and adjustments of content thereof discussed herein. For example, the present invention is not limited to wrapping text around embedded images based on the width of the text, and may likewise be applied for adjusting images, audio, animations, etc. without departing from the spirit and scope of the present invention.

With respect back to FIG. 2, at step 235, the one or more electronic documents may be saved with the manipulation of the content and the adjustment of the one or more contents incorporated into the saved one or more electronic documents. For example, the layer tool (e.g., layer tool 50 as described with respect to FIG. 1) may be further configured to merge the individual layers of the contents into a single layer comprising the manipulation of the content and the adjustment of the one or more contents, and the appropriate document generating and/or editing application may be configured to save the single layer as the one or more electronic documents such that the one or more electronic documents comprise the manipulation of the content and the adjustment of the one or more contents. Accordingly, the integration of the individual layers is realized as the one or more electronic documents are saved such that the one or more electronic documents comprise the manipulation of the content and the adjustment of the one or more contents.

FIG. 6 is a flow diagram illustrating a process 600 for managing the display of content within opened windows of a touch screen enabled device in accordance with aspects of the present invention. At step 605, one or more applications (e.g., Microsoft® Office, Adobe® Reader®, Microsoft® Outlook®, YouTube Remote™, AutoCAD®, etc, which are registered and unregistered trademarks of Microsoft Corporation, Adobe Systems Inc., Google Inc., and Autodesk Inc., respectively, in the United States and/or other countries) are opened in one or more corresponding windows or graphical control elements on a touch screen enabled device (e.g., computing device 14 as described with respect to FIG. 1). In embodiments, the one or more applications may be any type of application, such as a document editor, a game, a browser, a multimedia player, a document reader, a widget, a messenger, a design tool, an art tool, etc. Furthermore, the one or more windows or graphical control elements may be any area of a display that comprises a visual area framed by a window decoration or border containing a portion of a graphical user interface of the one or more applications. It should be understood by those of ordinary skill in the art that the present invention is not limited by the type of application or window that is opened.

At step 610, data regarding each of the opened one or more applications and their corresponding one or more windows or graphical control elements is collected. For example, a layer tool (e.g., layering tool 50 as described with respect to FIG. 1) may be configured to collect data from each of the opened one or more applications and their corresponding one or more windows or graphical control elements. In embodiments, the data collected may include positional data for each of the one or more windows or graphical control elements within a display of the touch screen enabled device, the type of content displayed within each of the one or more windows or graphical control elements such as text, images, video, audio, animations, etc., positional data for any text, images, audio, animations, etc., displayed within the one or more windows, a size and type of font used for any text displayed within the one or more windows, and a data size of each of the contents and opened one or more applications. The positional data may be "x" and "y" coordinates of a predetermined number of data points along a border or outline of each of the one or more windows or graphical control elements and/or the content of each of the one or more windows or graphical control elements. The starting point may be any reference point from which to calculate positional data such as a corner of a display of the touch screen enabled device and/or a corner of one or more of the windows or graphical control elements in which the content is displayed. Once the data for each of the opened one or more applications and their corresponding one or more windows or graphical control elements is collected, the data may be stored in a data structure such as a hash table for later retrieval and subsequent analysis.

At step 615, the position of each of the one or more windows or graphical control elements within the display of the touch screen enabled device are determined using a mapping of the data collected for each of the one or more windows or graphical control elements. For example, the layer tool (e.g., layer tool 50 as described with respect to FIG. 1) may be configured to map the positional data collected for each of the one or more windows or graphical control elements to determine the position of each of the one or more windows or graphical control elements on the display of the touch screen enabled device. The position of each of the one or more windows or graphical control elements may be stored in the data structure for later retrieval and subsequent analysis. Accordingly, the layer tool is made aware of the exact position on the display of the touch screen enabled device for each of the one or more windows or graphical control elements.

At step 620, an opening of new application and its corresponding window on the touch screen enabled device or a manipulation of an existing opened application and its corresponding window is detected. For example, the layer tool (e.g., layer tool 50 as described with respect to FIG. 1) may be configured to detect the opening of new application and its corresponding window and/or a manipulation of an existing opened application and its corresponding window. As described herein, the manipulation of the existing opened application and its corresponding window may be based on a user initiated gesture (i.e., the physical act or motion performed on, or by, the input device (e.g., finger, fingers, pen/stylus, mouse, and so on) on the touch screen enabled device. In embodiments, the detection of the opening of the new application and/or a manipulation of an existing opened application may include the layer tool receiving a notification of such an event via the API framework. The notification may include the event that occurred (e.g., a new window was opened or an existing window was resized) and any data relevant to the event such as the positional data for a new or manipulated window, the type of content displayed within the new or manipulated window, positional data for the content displayed within the new or manipulated window, a size and type of font used for any text displayed within the new or manipulated window, and/or a data size for the content and application opened in the new window.

As should be understood by those of ordinary skill in the art, the layer tool is further configured to update the data stored in the data structure with new or modified data for each of the new or manipulated one or more application and its corresponding one or more windows or graphical control elements, and update the mapping of the data collected for each of the opened one or more application and their corresponding one or more windows or graphical control elements. As such, the layer tool is persistently aware of the position of each of the one or more windows or graphical control elements within the display of the touch screen enabled device no matter whether a new application and its corresponding window is opened or an existing application and its corresponding window is manipulated.

Figure 7:
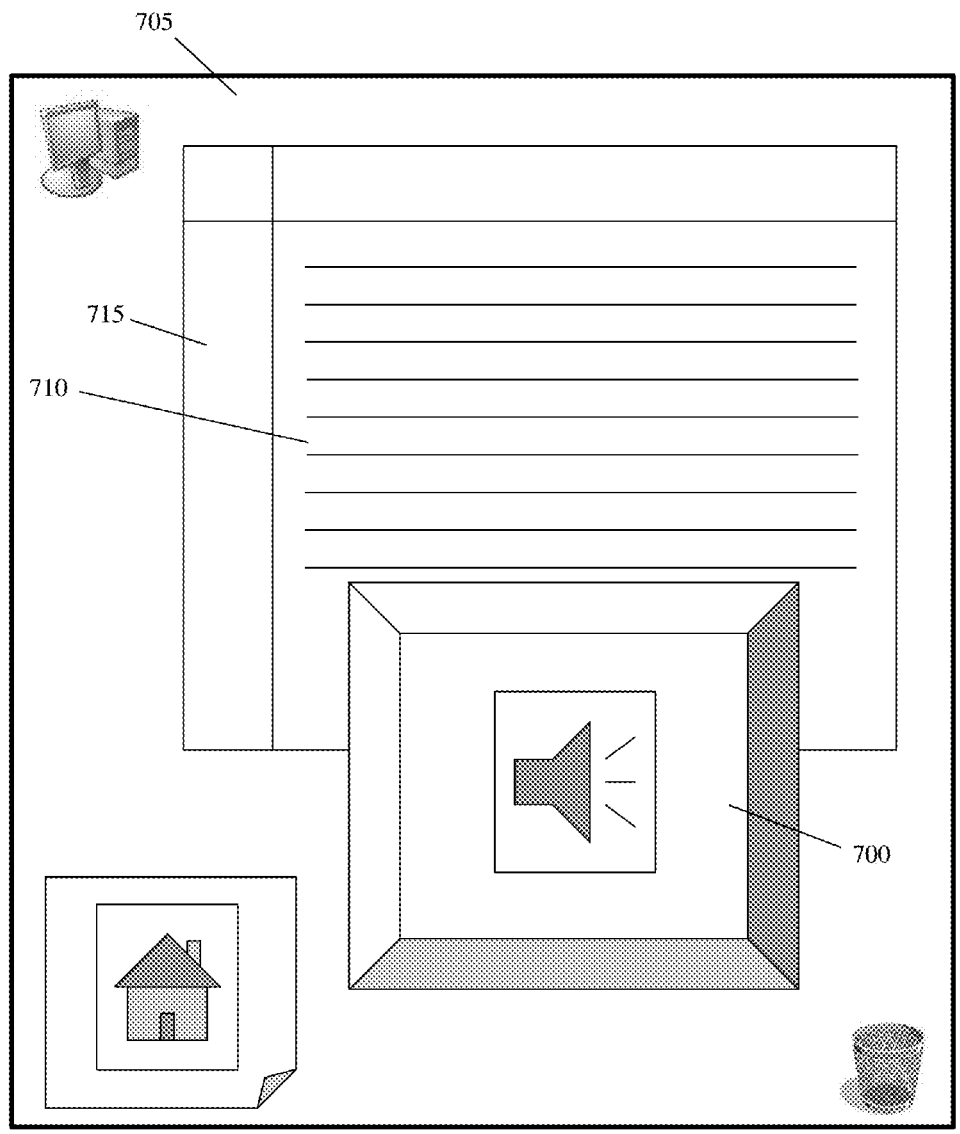
FIGS. 7, 8A, 8B, and 8C show visual representations of examples of operation in accordance with aspects of the invention

At step 625, an adjustment of one or more of the contents within the one or more windows or graphical control elements is performed as a result of the detected opening of a new application and its corresponding window or the manipulation of an existing application and its corresponding window. For example, as shown in FIG. 7, in the instance that a first window 700 is opened or resized (i.e., an interaction manifested by way of a detected manipulation of the first window 700) on the display 705 of a touch screen enabled device, the layer tool (e.g., layer tool 50 as described with respect to FIG. 1) may be configured to adjust the text content 710 (i.e., one or more of the contents within the one or more windows or graphical control elements) within a second window 715 in such a manner that the readability or viewability of the text content 710 is not obstructed or impaired as a result of the opening or resizing of the first window 700.

In embodiments, the adjustment of one or more of the contents within the one or more windows or graphical control elements may include: (i) determining whether there is a conflict between the contents within an existing window or graphical control element and another window or graphical control element that was opened or manipulated (e.g., at least a portion of a piece of content displayed within an existing window is covered or obstructed by an opened or manipulated windows) based on the tracked and mapped positional data for the contents and the windows; (ii) when there is a conflict, adjusting the one or more of the contents within the one or more windows or graphical control elements such that there is no conflict; (iii) determining whether the readability or viewability of the one or more of the contents is impaired as a result of the adjusting the one or more of the contents; and (iv) upon determining the readability or viewability of the one or more of the contents is impaired, further adjusting the one or more of the contents within the one or more windows or graphical control elements such that the readability or viewability of the one or more of the contents is not impaired. To this end, the windows displaying the contents are structured in such a manner that each of the windows are interrelated, and therefore, the manipulation of a window may cause an adjustment of content to be made in another window in order to maintain the readability or viewability of all contents within the one or more windows.

Figure 8A:
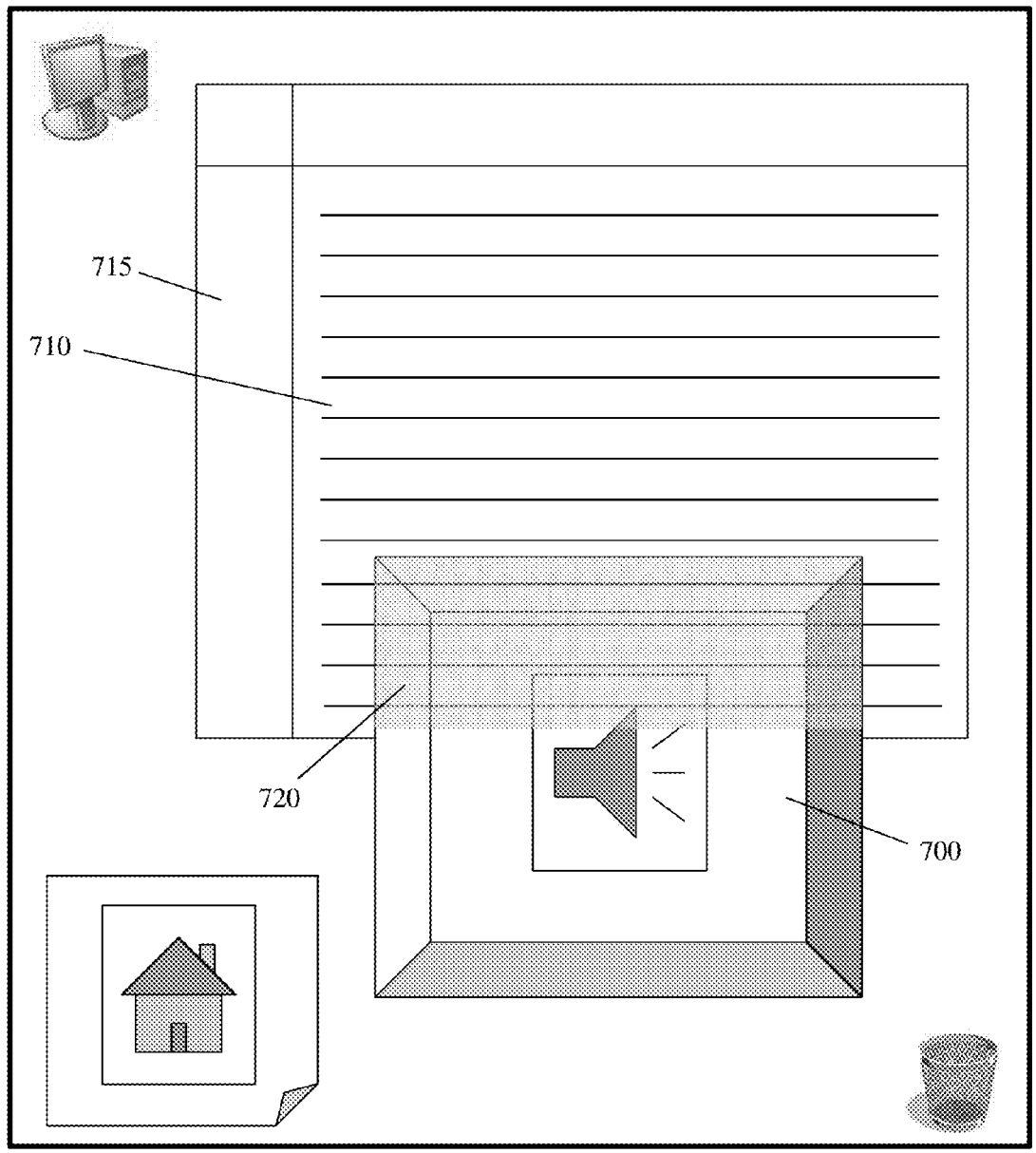

For example, as shown in FIG. 8A, in the instance that the first window 700 is opened or resized, the layer tool (e.g., layer tool 50 as described with respect to FIG. 1) may be configured to determine that the first window 700 has been opened or resized in such a manner that the first window 700 conflicts with or overlaps (e.g., obstructs) at least a portion 720 of the text content 710 within the second window 715 based on the tracked and mapped positional data for each of the contents and windows. In embodiments, the determination of the conflict or overlap between the contents may include comparing the starting and updated positional data stored within the data structure for each of the contents and windows. As should be understood by those of ordinary skill in the art, the comparison between the positional data provides data sets to make a determination as to whether the opening or interaction manifested by way of the detected manipulation of the window has caused a conflict or overlap between the window and the content of another window.

Figure 8B:
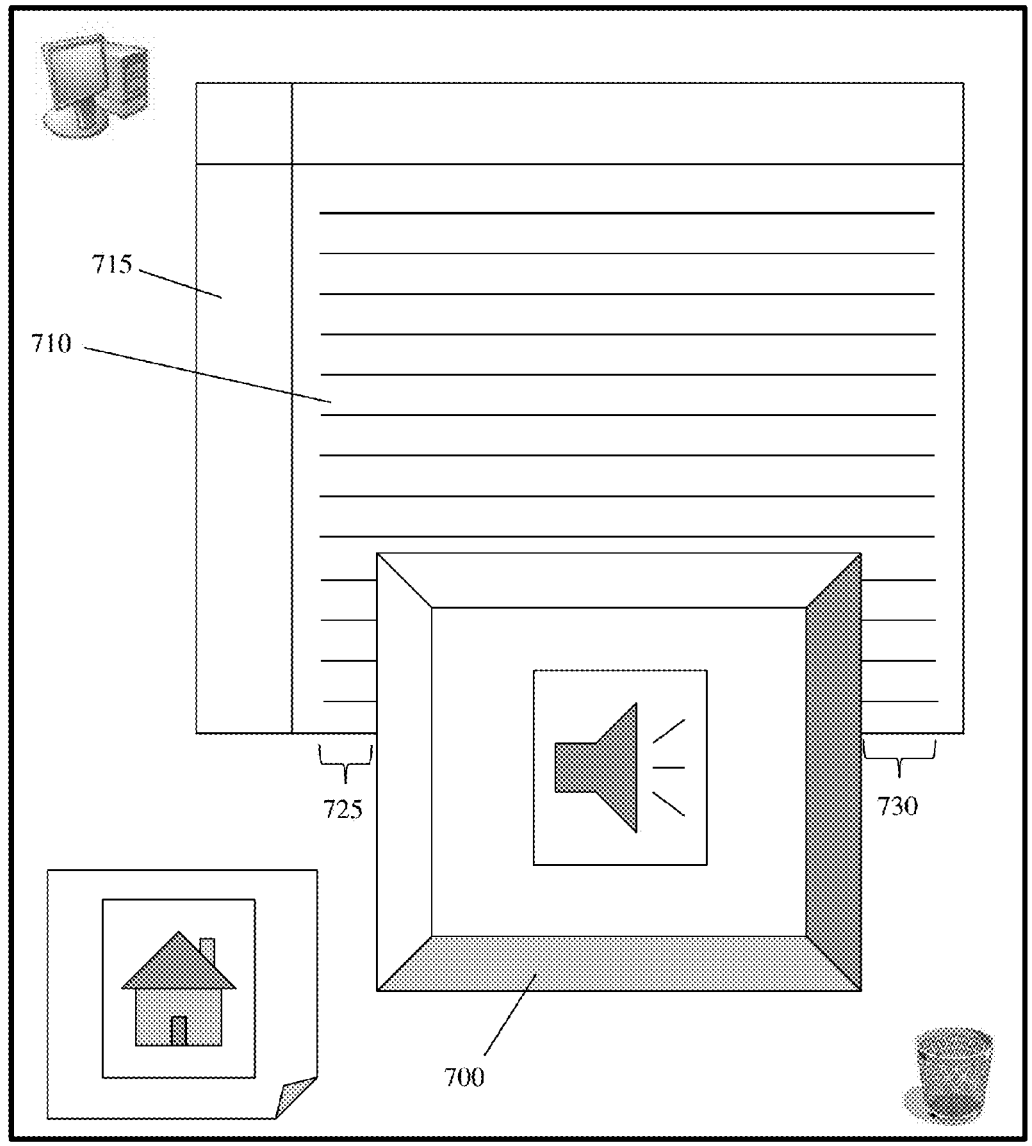

As shown in FIG. 8B, upon a determination that there is a conflict or overlap between the window and the content of another window, the layer tool (e.g., layer tool 50 as described with respect to FIG. 1) may be further configured to automatically adjust the text content 710 such that there is no conflict or overlap between first window 700 and the text content 710 within the second window 715. In embodiments, the adjustment may include wrapping or realigning the text content 710 around the first window 700. For example, the text content 710 within the second window 715 may be adjusted to flow or wrap around the first window 700 such that none of the text content 710 is in conflict with or overlapped by the first window 700. Optionally, the adjustment of the content (e.g., the wrapping or flowing of text around a window) may be controlled by the layer tool based at least in part on preferences set by a user. For example, a user may choose a border (e.g., a width and/or color of a border) to be placed around the first window 700 such that there is a separation or space between the text content 710 and the first window 700. Accordingly, the adjustment of the text content 710 around the first window 700 provides a seamless transition between content of the one or more opened windows such that the text content 710 is not obscured by the first window 700.

As should be understood by those of ordinary skill in the art, in the instance that the text content 710 within the second window 715 is adjusted, the layer tool may be configured to track and map updated positional data of the text content 710 within the second window 715. As described herein, the updated positional data may be "x" and "y" coordinates of a predetermined number of data points along a border or outline for the text content 710. Once the updated positional data for the text content 710 is obtained, the updated positional data may be stored in the data structure for later retrieval and subsequent analysis.

As also shown in FIG. 8B, the layer tool (e.g., layer tool 50 as described with respect to FIG. 1) may be further configured to determine whether the readability or viewability of the text content 710 is impaired as a result of the adjustment of the text content 710. For example, the layer tool may be configured to determine one or more aspects 725 and 730 (e.g., height, width, length, blurriness, percentage obstructed, percentage not obstructed, etc.) of the text content 710 based on the collected data including the updated positional data for the text content 710. Thereafter, the layer tool may be further configured to compare the one or more aspects 725 and 730 of the text content 710 to a predetermined threshold that is tolerable or intolerable for the one or more aspects 725 and 730 of the text content 710. Upon the one or more aspects 725 and 730 surpassing or failing the predetermined threshold (e.g., both aspects 725 and 730 are smaller than a predetermined threshold of a one inch width for the text content 710), the text content 710 may be evaluated by the layer tool as being satisfactory or impaired (e.g., since both aspects 725 and 730 are smaller than the predetermined threshold of a one inch width for the text content 710 515, the text content 710 would be evaluated as impaired).

Figure 8C:
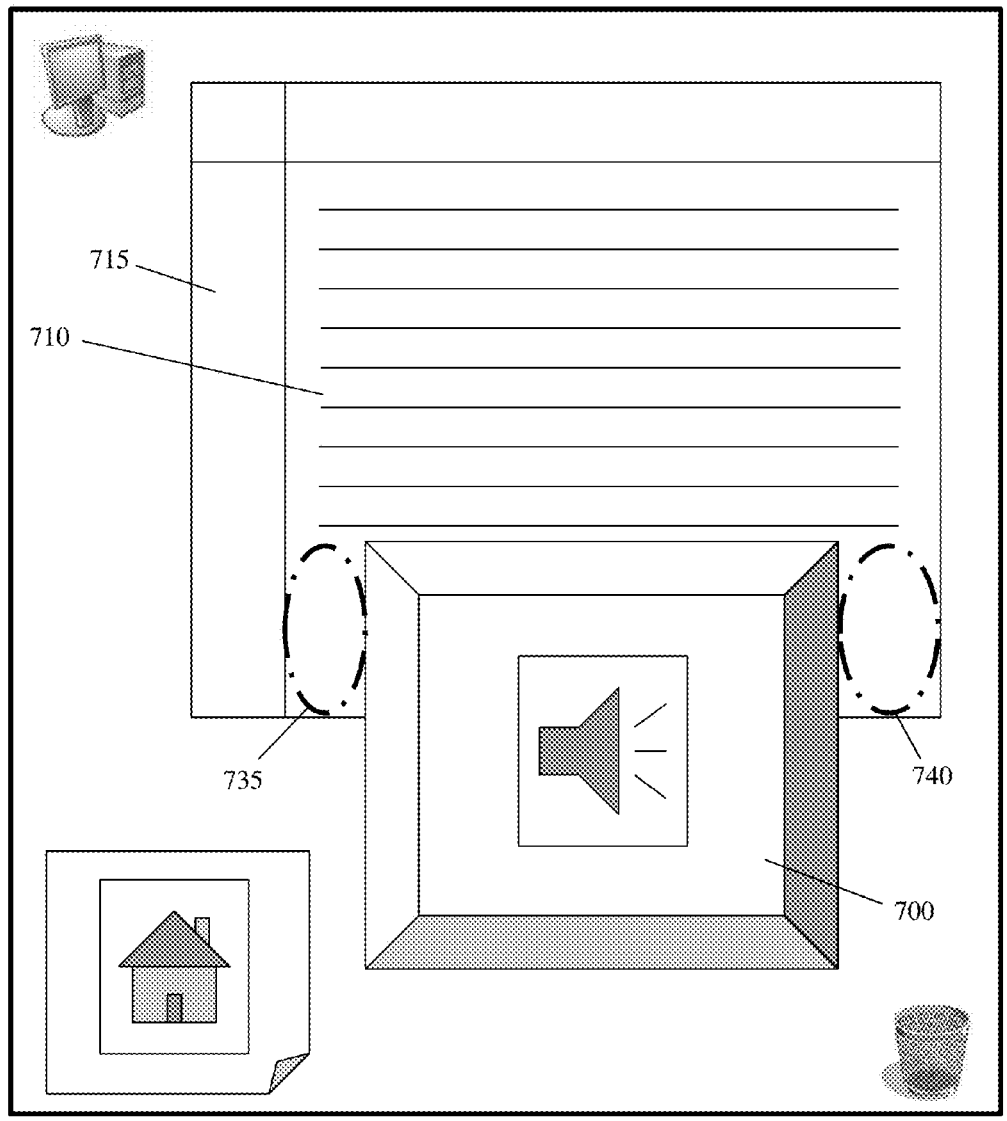

As shown in FIG. 8C, upon a determination that the text content 710 is impaired, the layer tool (e.g., layer tool 50 as described with respect to FIG. 1) may be configured to further adjust the text content 710 such that the readability or viewability of the text content is not impaired. For example, the layer tool may be configured to adjust the text content 710 such that the small aspect portions 735 and 740 of the text content 710 are not created from the wrapping of the text content 710 around the first window 700. Instead, the text content 710 is limited to only being displayed above the first window 700. For example, a font size of the text content 710 may be decreased such that the text content 710 is only displayed above the first window 700.

As should be understood by those of ordinary skill in the art, the above-mentioned examples including the opening or manipulations of windows, aspects of content, and adjustments of content are merely illustrative of the present invention, and thus the present invention is not limited by particular openings or manipulations of windows, aspects of content, and adjustments of content thereof discussed herein. For example, the present invention is not limited to wrapping text around windows based on the width of the text, and may likewise be applied for adjusting images, audio, animations, etc. without departing from the spirit and scope of the present invention.

In embodiments, the invention provides a method that performs the process of the invention on a subscription, advertising, and/or fee basis. That is, a service provider, such as a Solution Integrator, could offer to provide the data collection and content adjustment functionality on a network. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for collecting data and adjusting content on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:
   collect data regarding contents of an electronic document that is opened on a device, wherein the data includes types of the contents and positional data of the contents including "x" and "y" coordinates defining the positional data;
   separate the contents into individual layers based on the types of the contents;
   determine a position of each of the contents within the electronic document based on the positional data of the contents;
   detect a manipulation of a first piece of content of the contents on the device;
   detect an updated position of the first piece of content after the manipulation based on updated positional data including "x" and "y" coordinates defining the updated positional data;
   determine whether the manipulation of the first piece of content has created an overlap with at least a portion of a second piece of content of the contents based on comparing the updated position of the first piece of content with the determined position of the second piece of content, wherein the second piece of content is text content;
   wrap the text content around the first piece of content when manipulation of the first piece of content has created an overlap with the at least a portion of the second piece of content;
   determine whether readability or viewability of at least a portion of the text content is obstructed as a result of wrapping the text content around the first content, wherein the readability or viewability is obstructed when an aspect portion of the text content is generated, wherein the aspect portion includes a margin of the text content; and
   further adjust the second piece of content when the readability or viewability of the portion of the text content is obstructed, such that the readability or viewability of the portion of the text content is not obstructed, wherein the adjusting is based on separating the contents into the individual layers and includes refraining from generating the aspect portion of the text content.

2. The method of claim 1, wherein:
   the device is a touch screen enabled device;
   the manipulation occurs by way of a gesture on the touch screen enabled device; and
   the data is collected from metadata of the contents and electronic document.

3. The method of claim 2, wherein the contents comprise one or more of text content, image content, audio content, video content, and animation content.

4. The method of claim 3, wherein the detecting the manipulation comprises receiving a notification via an application programming interface that the gesture has occurred.

5. The method of claim 4, wherein the programming instructions are further operable to determine whether the readability or viewability of the second piece of content is impaired as a result of the adjustment of the second piece of content.

6. The method of claim 5, wherein the programming instructions are further operable to when the readability or viewability of the second piece of content is impaired, further adjust the second piece of content such that the readability or viewability of the second piece of content is not impaired as a result of the adjusting the second piece of content.

7. The method of claim 6, wherein:
   the determining whether the readability or viewability of the second piece of content is impaired comprises comparing one or more aspects of the second piece of content to a predetermined threshold, including a percentage obstructed; and
   the programming instructions are further operable to save the electronic document such that the manipulation of the first piece of content, the adjustment of the second piece of content, and the further adjustment of the second piece of content are incorporated into the saved electronic document.

8. The method of claim 7, wherein the predetermine threshold is a predetermined tolerable width for any portion of the second piece of content.

9. The method of claim 1, wherein a service provider at least one of creates, maintains, deploys and supports the computer infrastructure.

10. A computer program product for managing a display of content within an opened electronic document on a touch screen enabled device, the computer program product comprising a computer readable storage medium having program instructions embodied therewith, wherein the computer readable storage medium is not a transitory signal per se, and the program instructions are readable by a computing device to cause the computing device to perform a method comprising:
   collecting data regarding contents of the electronic document, wherein the data includes types of the contents and positional data of the contents including "x" and "y" coordinates defining the positional data;
   separating the contents into individual layers based on the types of the contents;
   determining a position of each of the contents within the electronic document based on the positional data of the contents;
   receiving a notification via an application programming interface that a gesture has occurred on the touch screen enabled device that is indicative of a manipulation of a first piece of content of the contents;
   detecting an updated position of the first piece of content after the manipulation based on "x" and "y" coordinates defining the updated position;
   determining whether the manipulation of the first piece of content has created an overlap with at least a portion of a second piece of content of the contents based on comparing the updated position of the first piece of content with the determined position of the second piece of content, wherein the second piece of content is text content;

wrapping the text content around the first piece of content when manipulation of the first piece of content has created an overlap with the at least a portion of the second piece of content;

determining whether readability or viewability of at least a portion of the text content is obstructed as a result of wrapping the text content around the first content, wherein the readability or viewability is obstructed when an aspect portion of the text content is generated, wherein the aspect portion includes a margin of the text content; and further adjusting the second piece of content when the readability or viewability of the portion of the text content is obstructed, such that the readability or viewability of the portion of the text content is not obstructed, wherein the adjusting is based on separating the contents into the individual layers and includes refraining from generating the aspect portion of the text content.

11. The computer program product of claim 10, wherein the data is collected from metadata of the contents and electronic document.

12. The computer program product of claim 10, wherein the contents comprise one or more of text content, image content, audio content, video content, and animation content.

13. The computer program product of claim 10, wherein the method further comprises determining the readability or viewability of the second piece of content is impaired as a result of the adjusting the second piece of content.

14. The computer program product of claim 13, wherein the method further comprises further adjusting the second piece of content such that the readability or viewability of the second piece of content is not impaired as a result of the adjusting the second piece of content.

15. The computer program product of claim 14, wherein the determining the readability or viewability of the second piece of content is impaired comprises comparing one or more aspects of the second piece of content to a predetermined threshold and the one or more aspects failing the predetermined threshold.

16. The computer program product of claim 15, wherein the first content is image content and the manipulation is a resizing of the image content.

17. The computer program product of claim 16, wherein the second content is text content and the adjusting the second piece of content such that the readability or viewability of the portion of the second piece of content is not obstructed by the first piece of content comprises wrapping the text content around the image content.

18. A system comprising:
a CPU, a computer readable memory and a computer readable storage medium;
program instructions to collect data regarding contents of one or more windows that are opened on a touch screen enabled device, wherein the data includes types of the contents, positional data of the contents including "x" and "y" coordinates defining the positional data, and positional data of the one or more windows;
program instructions to separate the contents into individual layers based on the types of the contents;
program instructions to determine a position of each of the contents and one or more windows based on the positional data of the contents and the one or more windows;
program instructions to detect a manipulation of a first window of the one or more windows by way of a gesture on the touch screen enabled device;
program instructions to detect an updated position of the first window after the manipulation based on "x" and "y" coordinates defining the updated position of the first window;
program instructions to determine whether the manipulation of the first window has created an overlap with at least a portion of a second piece of content of the contents based on comparing the updated position of the first window with the determined position of the second piece of content, wherein the second piece of content is text content;
program instructions to wrap the text content around the first window when the manipulation of the first window has created an overlap with the at least a portion of the second piece of content;
program instructions to determine whether readability or viewability of at least a portion of the text content is obstructed as a result of wrapping the text content around the first window, wherein the readability or viewability is obstructed when an aspect portion of the text content is generated, wherein the aspect portion includes a margin of the text content; and
program instructions to adjust the second piece of content when the readability or viewability of the portion of the text content is obstructed such that the readability or viewability of the portion of the text content is not obstructed by the first window, wherein the adjusting is based on separating the contents into individual layers and includes refraining from generating the aspect portion of the text content,
wherein the program instructions are stored on the computer readable storage medium for execution by the CPU via the computer readable memory.

19. The system of claim 18, wherein each of the one or more windows are an area of a display of the touch screen enabled device that comprises a visual area framed by a window decoration or border containing a portion of a graphical user interface of one or more applications, wherein the program instructions to determine whether the manipulation of the first window has created an overlap further include program instructions to determine that the "x" and "y" coordinates defining the updated position of the first window overlaps "x" and "y" coordinates defining the position of the second piece of content.

* * * * *